(12) United States Patent
Ponganis et al.

(10) Patent No.: US 8,515,018 B2
(45) Date of Patent: Aug. 20, 2013

(54) AUTOMATIC TELEPHONE LINE LOOP AROUND SYSTEM AND METHOD

(75) Inventors: Edward P. Ponganis, Modesto, CA (US); Igor L. Chudakov, San Jose, CA (US); Luis R. A. Larzabal, Sunnyvale, CA (US)

(73) Assignee: Actelis Networks Inc., Fremont, CA (US)

( * ) Notice: Subject to any disclaimer, the term of this patent is extended or adjusted under 35 U.S.C. 154(b) by 1399 days.

(21) Appl. No.: 12/107,654

(22) Filed: Apr. 22, 2008

(65) Prior Publication Data

US 2009/0262904 A1 Oct. 22, 2009

(51) Int. Cl.
*H04M 1/24* (2006.01)
*H04M 3/08* (2006.01)
*H04M 3/22* (2006.01)

(52) U.S. Cl.
USPC ...... 379/27.06; 379/2; 379/26.02; 379/29.05; 379/29.11

(58) Field of Classification Search
USPC ............... 379/1.01, 9, 10.01, 15.01, 2, 22.04, 379/22.06, 27.01, 27.04, 27.05, 29.01, 29.05, 379/26.02, 29.11, 27.06
See application file for complete search history.

(56) References Cited

U.S. PATENT DOCUMENTS

| | | | |
|---|---|---|---|
| 3,825,698 A | 7/1974 | Chambers, Jr. | |
| 4,056,687 A | 11/1977 | Sims | |
| 4,434,328 A * | 2/1984 | Fields | 379/8 |
| 4,493,073 A | 1/1985 | Witmore et al. | |
| 5,115,462 A | 5/1992 | Kennedy et al. | |
| 5,524,043 A * | 6/1996 | DeBalko | 379/2 |
| 5,768,341 A * | 6/1998 | Pryor et al. | 379/29.11 |
| 5,867,557 A * | 2/1999 | D'Andrea et al. | 379/15.02 |
| 5,923,748 A | 7/1999 | Hwang | |
| 6,040,640 A | 3/2000 | Gehre | |
| 6,201,853 B1 * | 3/2001 | Butler et al. | 379/21 |
| 6,278,769 B1 * | 8/2001 | Bella | 379/29.11 |
| 6,301,337 B1 * | 10/2001 | Scholtz et al. | 379/30 |
| 6,549,610 B2 | 4/2003 | Kikui | |
| 6,584,148 B1 * | 6/2003 | Zitting et al. | 375/222 |
| 6,870,903 B2 | 3/2005 | Angliss et al. | |
| 7,023,672 B2 | 4/2006 | Goodfellow et al. | |
| 7,027,589 B2 | 4/2006 | Shi et al. | |
| 7,068,758 B1 * | 6/2006 | Wallace et al. | 379/29.05 |
| 2002/0122539 A1 * | 9/2002 | Chea et al. | 379/27.01 |
| 2002/0131568 A1 * | 9/2002 | Chea et al. | 379/93.14 |

FOREIGN PATENT DOCUMENTS

WO WO 02/09407 1/2002

\* cited by examiner

*Primary Examiner* — Binh Tieu
(74) *Attorney, Agent, or Firm* — Pearl Cohen Zedek Latzer, LLP

(57) ABSTRACT

A loop around system and method for use in a telephone line monitors line conditions to detect the initiation of loop testing and automatically bypasses an electronic device, such as a DSL line conditioner, used in the line to prevent the electronic device from being inadvertently detected by the testing system as a line fault. The system additionally shuts down power to itself from the line so that it does not interfere with testing, while continuing to monitor the line during testing to detect conditions that characterize the termination of testing, and then automatically switches the electronic device back into the line upon the conclusion of testing. The system and method may be employed unattended at intermediate locations in the line remote from the CO or the CPE.

34 Claims, 4 Drawing Sheets

AUTOMATIC TELEPHONE LINE LOOP AROUND SYSTEM AND METHOD

BACKGROUND

This invention relates generally to telephone line loop testing, and more particularly to electrically bypassing electronic devices, such as DSL line amplifiers, extenders, or line conditioners at intermediate locations in the telephone line during testing.

In order to maintain toll quality of telephone lines, telephone companies ("Telcos") periodically test the lines to detect the presence of faults. Conventional POTS ("Plain Old Telephone System") telephone lines comprising twisted copper pair lines, for example, are frequently tested for shorts, opens, balance, currents and voltages, and to determine the makeup of the lines by using mechanized loop testing ("MLT") equipment installed at the telephone central office (CO). MLT testing involves applying to the tip (T) and ring (R) POTS lines at the CO a series of different AC and DC voltages having particular values, shapes, such as ramps, sine, waves, pulses, etc., and particular timings, and determining the presence of faults and line characteristics based upon measurements of the line voltages and current responses to the different testing signals. MLT testing techniques are well understood and widely used by all Telcos to maintain the quality of the telephone lines in their public switched telephone networks ("PSTN").

In addition to detecting line faults and measuring characteristics, MLT equipment will detect any extraneous equipment in the telephone lines that causes a deviation from expected results and indicate a possible fault. Therefore, many Telcos require vendors of authorized line equipment to register unique signatures or IDs for their equipment in order to identify it to the MLT testing equipment. Additionally, some equipment may have to be physically disconnected from the line to permit MLT testing, which requires that the vendors be apprised of the scheduled testing times. Registering unique signatures generally requires expensive changes to the MLT hardware or software, and Telcos are reluctant to do so. For non-authorized vendors, there is no convenient way to register their signatures with the major Telcos, or to know of testing schedules in advance. This hampers the ability of independent equipment vendors to market equipment intended for connection to a telephone line.

With the increasing demand for DSL and broadband services over conventional telephone lines, the problem of dealing with MLT testing is particularly severe for many vendors of electronic devices and equipment for DSL and broadband applications, particularly for electronic devices or equipment such as line amplifiers, line extenders and line conditioners. These are typically inserted in the telephone line at intermediate locations between the CO and a customer's premises (CPE), and may be powered directly from the telephone line. Because of their remote locations, it has not been practical to remove such devices from the telephone line to permit MLT testing, and there are no known systems or devices that can detect when testing occurs and do this automatically.

There is a need for systems and methods that can operate unattended at remote locations in a telephone line to detect the initiation of an MLT test, automatically remove an electronic device from the telephone line, determine when the loop testing had been concluded, and automatically reinsert the electronic device into the line following testing without requiring changes to the MLT hardware or software. It is to these ends that the present invention is directed.

SUMMARY OF THE INVENTION

In one aspect, the invention provides a method and a system for bypassing an electronic device at an intermediate location of a telephone line during testing of the line, in which initiation of testing is sensed at the intermediate location, and the electronic device is automatically removing from the line. The line is monitored, and upon detecting the cessation of testing, the electronic device is automatically reinserted into the line.

In another aspect, the invention provides a system and method for automatically detecting testing of a twisted pair telephone line and for bypassing an electronic device at an intermediate location in the line during the testing, in which the occurrence of a first line condition that characterizes the initiation of testing is sensed at the intermediate location, and the electronic device is automatically bypassed by switching it out of the line. The line is monitored for a second line condition that characterizes the termination of line testing, and upon detecting the occurrence of the second line condition, the electronic device is automatically switched back into the line.

In yet another aspect, the invention provides a system for bypassing an electronic device in an intermediate location of a telephone line during testing that comprises a detector for monitoring conditions on the line and for detecting the occurrence of a first line condition that characterizes the initiation of testing, and for detecting a second line condition that characterizes the cessation of testing. A controller that is responsive to the detector controls switches that automatically switch the electronic device out of the line upon detecting the occurrence of the first line condition, and to automatically switch the electronic device back into the line upon detecting the occurrence of the second line condition. An isolation circuit electrically isolates the system from the line during testing, while the system remains active and continues to monitor the line to determine the cessation of testing.

BRIEF DESCRIPTION OF THE DRAWINGS

FIG. 2, comprising

DESCRIPTION OF PREFERRED EMBODIMENTS

The invention is particularly well adapted for use in a conventional POTS telephone line for automatically bypassing an electronic device in the line during mechanized loop testing ("MLT"), and will be described in that context. However, as will be appreciated, this is illustrative of only one utility of the invention.

Figure 1:
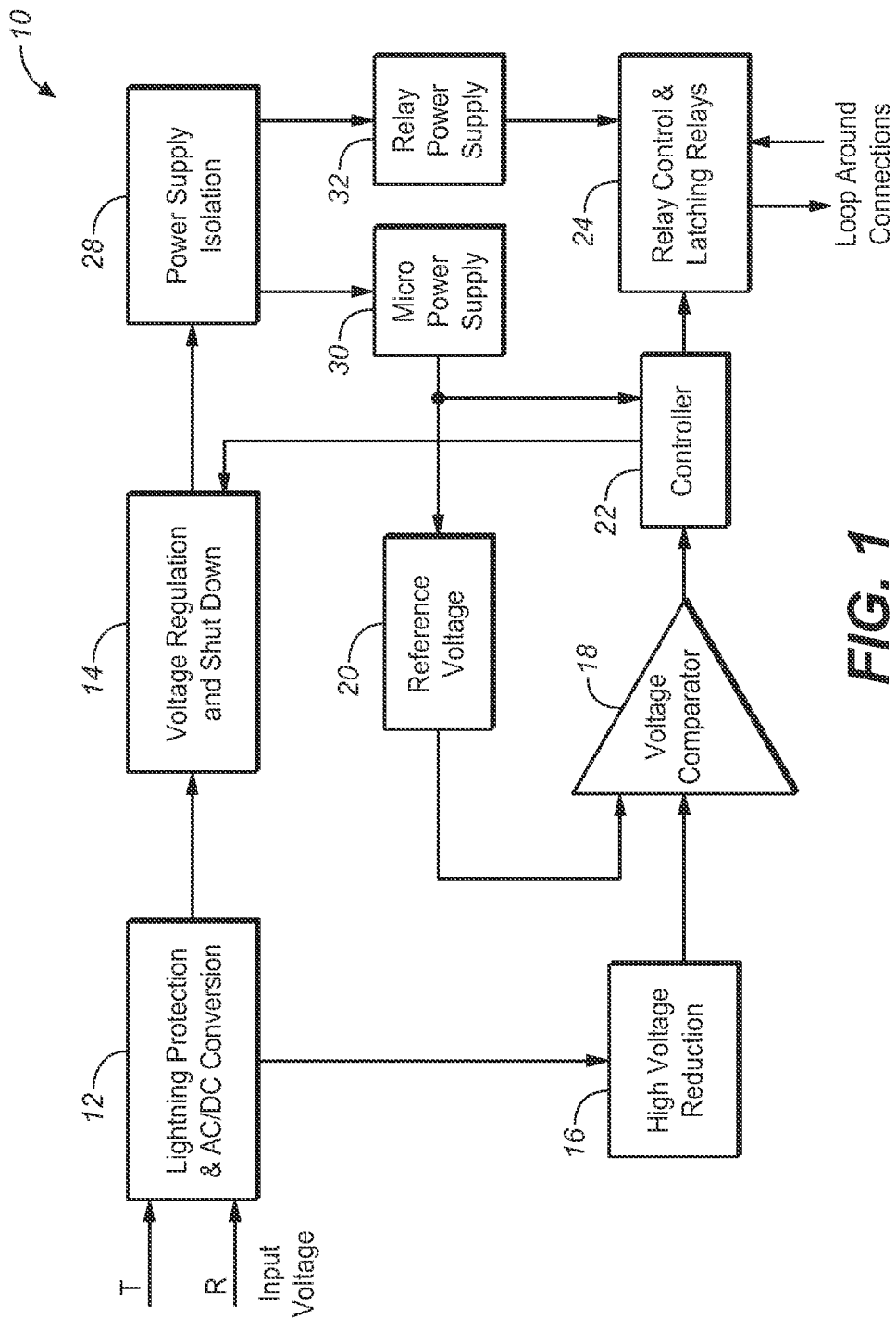
FIG. 1 is a block diagram of a system in accordance with an embodiment of the invention for automatically removing an electronic device from a telephone line during line testing.

FIG. 1 is a block diagram of a system in accordance with one embodiment of the invention for automatically bypassing (looping around) or otherwise removing an electronic device, such as a DSL line conditioner, from a telephone line during CO loop testing of the line. The system may be located at an intermediate location in the line, and may operate unattended to detect the initiation of loop testing, automatically bypass the electronic device, detect the cessation of testing, and automatically reinsert the electronic device into the telephone line, all in ways that avoid interfering with normal telephone operations and avoid being detected by the loop testing.

The system 10 may be connected between the tip (T) and ring (R) lines of the conventional POTS twisted pair telephone line, and monitor the line conditions to detect the initiation and cessation of testing, as will be described. In a conventional twisted pair POTS line, the tip (T) line is normally maintained at ground potential (0 VDC) and the ring (R) line is typically at a potential of about −48 VDC at the central office (CO) when the telephone at the customer premises (CPE) is on-hook, i.e., hung up. At intermediate locations in the telephone line between the CO and the CPE, the line voltage will vary with distance from the CO due to line impedance. As is well known, in addition to carrying normal voice and data signals, a telephone line carries numerous other signaling tones and control voltages at various times. For instance, during ringing, an AC ring signal comprising voltage pulses of the order of about 90 VACrms is applied to the R line until the phone goes "off-hook." When the phone is off-hook, the R voltage may "drop" to a voltage potential of the order of one-half of the on-hook line voltage, e.g., −20 VDC, with voice telephone and data signals, if any, riding on top of the DC voltage. In addition, telephone lines are subject to noise, interference, and high voltage electrical impulses due, for example, to lightning, which can be short duration voltage impulses of several hundred volts, e.g., 400V. Accordingly, as indicated in FIG. 1, the input voltage to the system from the T and R lines may first be provided to a lightning protection and AC/DC conversion module (circuit) 12 which converts the input telephone line voltage to a DC voltage that is supplied to a voltage regulation and shutdown module 14, and provides protection to the system from high voltage impulses on the line due, for example to lightning. The voltage regulation and shutdown module 14 reduces the levels of the various voltages coming from the lightning protection circuit and provides regulated voltages to operate the system. This module may also serve to electrically isolate the system from the telephone lines during loop testing, as will be described.

The lightning protection and AC/DC conversion module 12 also provides an output voltage corresponding to the line voltage to a high voltage reduction module 16, which, in turn, provides a DC voltage that is representative of the line voltage to a voltage comparator module 18. Since the normal on-hook operating voltage on the telephone line at intermediate line locations may be in the 40 VDC range, and since the line is subject to high impulse voltages, due, for example, to lightning, the high voltage reduction circuit 16 preferably limits the maximum voltage supplied to the voltage comparator to a predetermined maximum. The voltage comparator may also receive as inputs reference voltages from a reference voltage module 20, and may provide outputs to a controller module 22. The voltage comparator 18 and the controller 22 function, in part, as a detector for sensing the line conditions that characterize the initiation and cessation of testing. The controller may supply control signals to a relay control and latching relay module 24 comprising latching relays or switches and associated control circuitry. The latching relays may, in turn, be connected to the electronic device and to the T and R lines, and function to loop around (bypass) the electronic device to remove it from the telephone line during testing and to reinsert the electronic device back into the telephone line following testing. Controller 22 may also provide a control signal to the voltage regulation and shutdown module 14 to substantially isolate system 10 from the line during testing, as will be described shortly.

The voltage regulation and shutdown module 14 provides a regulated voltage to a power supply isolation module 28, which, in turn, supplies voltages to a micro power supply 30 and to a relay power supply 32. The micro power supply provides regulated DC voltages to the reference voltage module 20 and to the controller 22. The relay power supply 32 supplies operating voltages to the relay control and latching relay module 24.

System 10 advantageously may be connected to the telephone line at an intermediate location of the line where an electronic device, such as a DSL line conditioner, is located to bypass the line conditioner during loop testing. As will be described in more detail shortly, the system 10 monitors the voltages on the telephone line at the intermediate location in order to detect line conditions that indicate the beginning and the end of loop testing. Upon sensing a first set of line conditions that characterize the initiation of testing, system 10 operates the latching relays to bypass the electronic device by switching it out of the line. The relays loop the tip and ring lines around the electronic device, effectively removing it from the telephone line. During testing, system 10 continues to monitor voltages on the telephone line to detect another set of line conditions that indicate that the loop testing has concluded. Upon detecting the termination of the loop testing, system 10 controls the latching relays to reinsert the electronic device into the line.

As will be described in more detail below, since the system will typically be located at an intermediate location of the line which is remote from both the CO and the CPE, the system is constructed to be capable of operating automatically and unattended. Moreover, it is constructed to be capable of correctly identifying the line conditions that indicate the commencement and termination of testing in the presence of the numerous signaling tones and voltages that are used on conventional telephone lines, and in the presence of noise and other electrical impulses due to lightning, etc., that may be impressed onto the line. Additionally, the system is preferably powered by the telephone line which it is monitoring, which necessitates that it draw current from the line. Accordingly, to avoid interfering with normal telephone operations, system 10 is designed to be low power and to draw only small amounts of current from the line. Moreover, since the load on the line presented by the system may be detected by the CO during loop testing, the system may be incorrectly identified as being a fault or otherwise cause a false indication of the line characteristics. To avoid this, the system substantially shuts down its power consumption during testing by substantially reducing its load on the line. This is accomplished by the voltage regulation and shut down module 14, as will be described, which effectively electrically isolates the system from the line. However, during testing the system must continue to be powered in order to monitor line conditions and detect the termination of testing. Thus, during this period the system operates on supplemental power, such as its own stored power, which must have the capacity to maintain the system in an operating state for the duration of testing.

Therefore, in accordance with the invention, the system 10 is designed to operate at very low power, drawing current preferably in the low microampere range, so that the system may employ an internal source of stored power to maintain the system in an operating state during testing. Additionally, the high voltage reduction module 16, which, as will be described, is not isolated from the line by the voltage regulation and shutdown module 14, is preferably designed to present a very high impedance to the line so that it draws a only a small amount of current that will neither interfere with normal telephone operations nor be detected by the testing equipment.

Figure 2A:
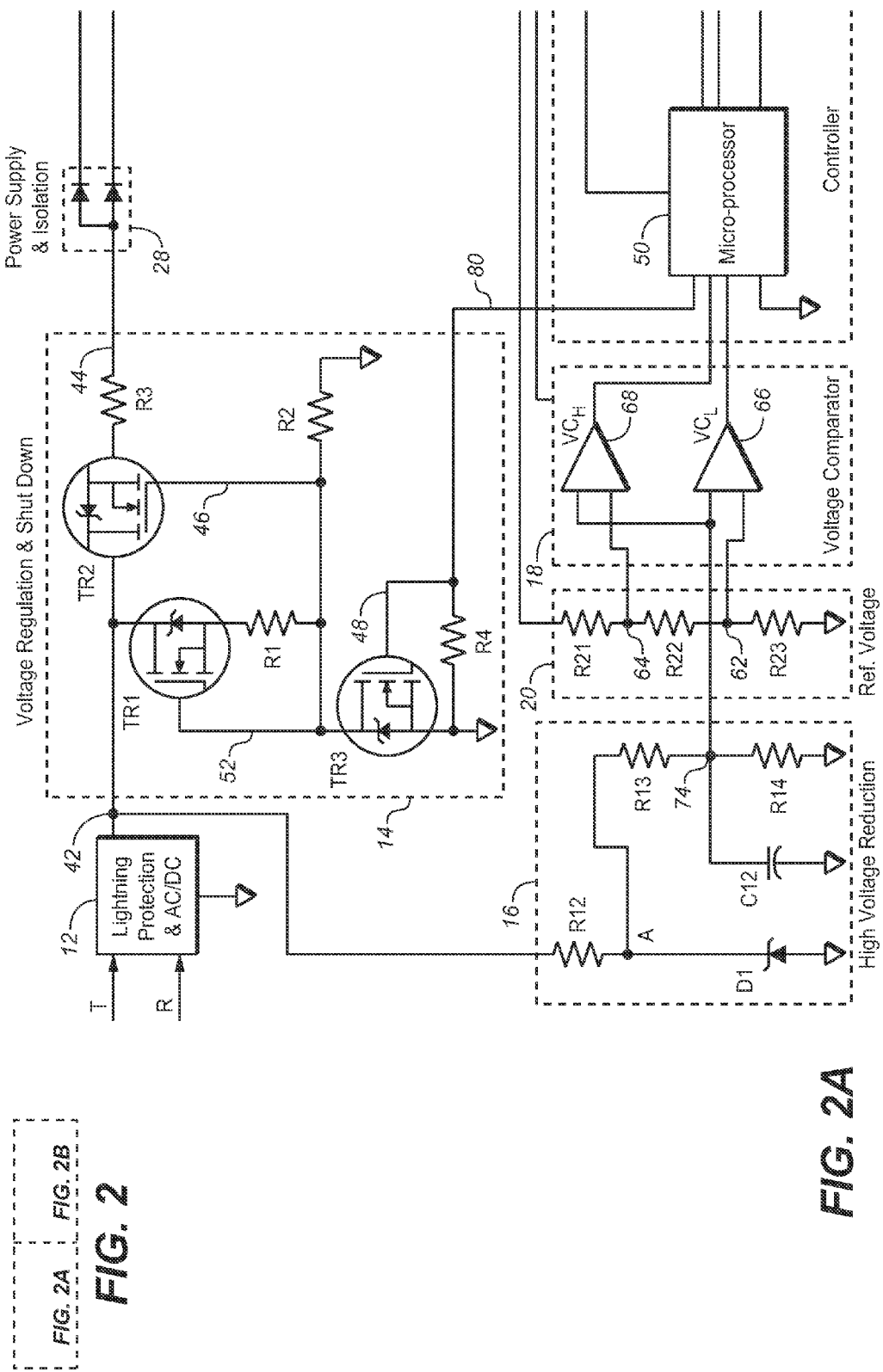
FIGS. 2A and 2B, is a schematic diagram of a preferred implementation of the system of FIG. 1.
Figure 2B:
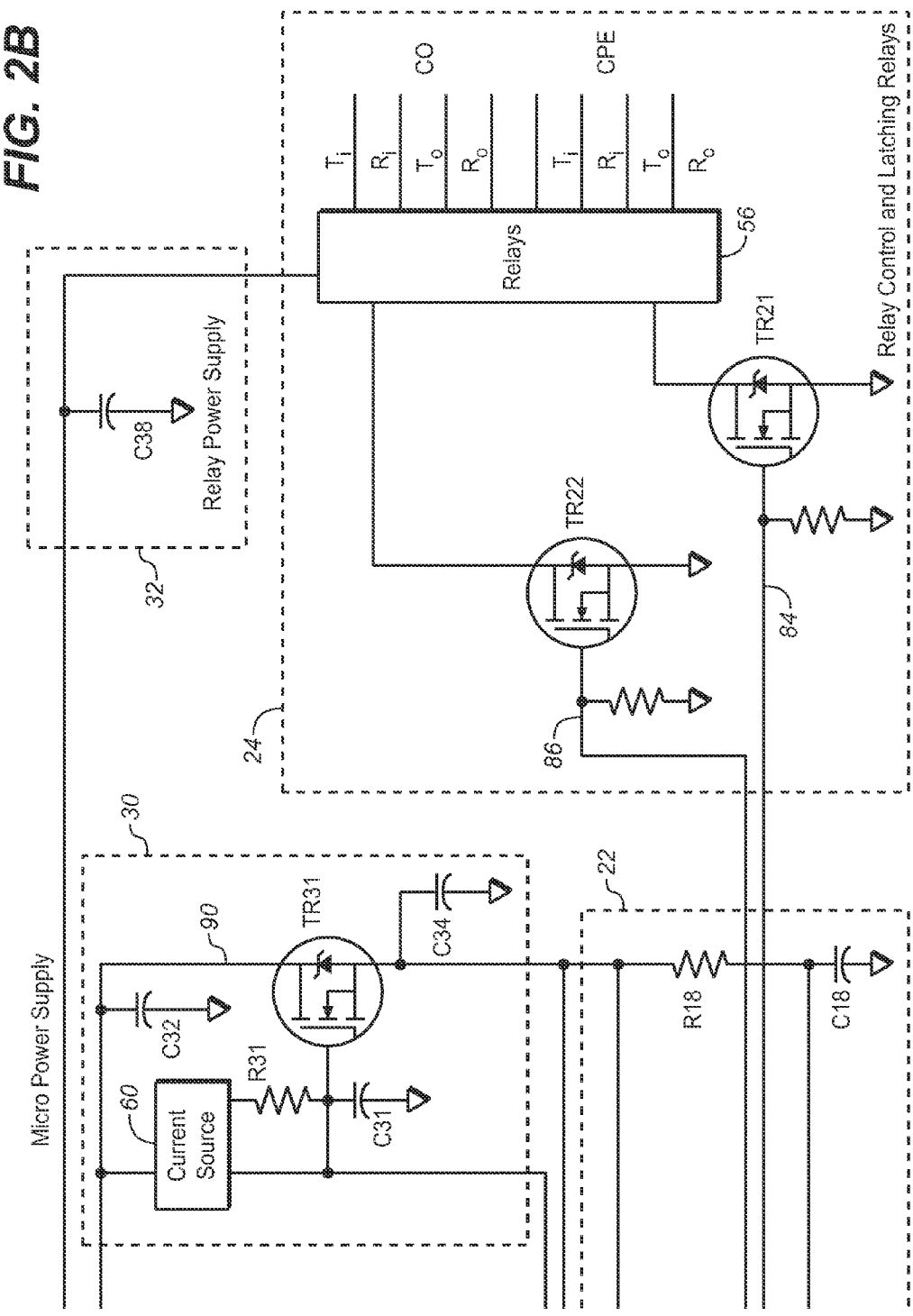

FIG. 2 is a schematic diagram of a preferred embodiment of the system of FIG. 1, and illustrates preferred implementations for the circuits and modules of the system shown in FIG. 1. Similar reference numbers to FIG. 1 are used in FIG. 2 to indicate corresponding modules.

Referring to FIG. 2, as previously indicated, the lightning protection and AC/DC conversion module 12 converts the voltages on the telephone line to DC voltages that are supplied to the voltage regulation and shutdown module 14 and to the high voltage reduction module 16. The module may comprise, for example, a full wave bridge rectifier circuit that converts the voltages at the output 42 of the module to positive DC voltages referenced to ground potential, and conventional lightning protection devices. The nominal DC voltage at the output 42 of the module 12 may be of the order of +40 VDC when the phone is on-hook. This voltage may be applied to the source terminals of a pair of MOS-FET transistors TR1 and TR2 in the voltage regulation and shutdown module 14, as shown. As previously mentioned, the voltage regulation and shutdown module 14 has two main functions. The first is to convert the various voltages at 42 coming from the lightning protection and AC/DC conversion module 12 to regulated voltages for operating power to the system. The second function is to electrically isolate the system from the telephone line during loop testing by shutting down the voltage from the module at 44 and substantially turning off current supplied to the system from the line during testing. These functions are achieved by controlling the gate voltage at 46 on TR2, which is determined by the voltage drop across resistor R2. This gate voltage (and the voltage across R2) is controlled by the drain current of transistor TR1 in the normal (non-testing) mode, and by transistor TR3 during loop testing. Transistor TR1 is normally biased to the on (conducting) state by the drain current through resistor R1, and, therefore, the current through R1 is a function of the threshold voltage of TR1. TR1 is preferably selected to have a negative threshold voltage. If, for example, the threshold voltage of TR1 is in the range of −1.5 to −3.5 V and R1 has a value of 1.27 MD (Megaohms), then the drain current through R1 will be in the range of 1.1 μA (microamps). Since transistor TR3 will normally be turned off, this drain current will flow through resistor R2 and will generate the gate voltage at 46 to transistor TR2. If resistor R2 has a value of the order of 10 MD, the gate voltage for this current flow will be of the order of between 11 and 27 V. This gate voltage will, in turn, limit the output voltage at 44 of the module 14 to a voltage of between approximately 9 and 26 V, even under conditions when the input voltage to the module may be an impulse as high as 400 V, as during a lightning strike. To accommodate such voltages, the breakdown voltage of both transistors TR1 and TR2 is preferably at least as high as 400 V.

Since the current through the transistors TR1 and TR2 presents a load on the line that will be measured by the loop testing equipment during testing and could affect the results of loop testing if it is too large, the values of the resistors in the module 14 are selected to limit the current flow into the module, preferably to be in the low microampere range. The function of resistor R3 is to limit surge current when charging various capacitors in the system upon the application of power.

In order to prevent the system from affecting the results of loop testing, during the testing period, the output voltage from the voltage regulation and shutdown module at 44 is preferably turned off in order to electrically isolate the system from the telephone line. This may be accomplished by turning on (render conducting) transistor TR3 by applying a gate voltage at 48 to the transistor. This gate voltage may be provided by a microprocessor 50 in the controller module 22 when the system detects the initiation of testing, as described below. When TR3 turns on, the gate voltage at 52 of TR1 is forced to approximately 0V which turns off (renders non-conducting) TR1 and TR2, thereby shutting down the output voltage of the module at 44.

The output of the voltage regulation and shutdown module is applied to a power supply isolation module 28, which may simply comprise a pair of diodes in parallel, one of which connects to the micro power supply module 30 and the other of which connects to the relay power supply module 32. During normal operation, current flowing through the two diodes from the voltage regulation and shutdown module to charge capacitors C32 in the micro power supply module 30 and C38 in the relay power supply module 32. Capacitors C32 and C38 preferably have large capacitance values of the order, for example, of 10 μF (MicroFarads), and serve as supplemental power sources for the system when the voltage regulation and shutdown module 14 is turned off at the initiation of loop testing. The normal output voltage of the module at 44 drops to approximately 0 V when the module is shut down. This turns off the voltage (and current) to the rest of the system from the voltage regulation and shutdown module, effectively isolating the system electrically from the telephone lines. The two diodes in the power supply and isolation module 28 prevent the capacitors from discharging back into the voltage regulation and shutdown module 14 when its output voltage goes to zero. Although other supplemental power sources, such as batteries, may be used to power the system during testing, capacitors are preferable because of their low cost and size. By designing the system to draw very low current, capacitors are capable of maintaining the system in an operating state to monitor the line during the testing period.

During normal operation, capacitor C38 in the relay power supply 32 is charged to between 9 to 26 V by the voltage output from the voltage regulation and shutdown module 14. The charge stored in capacitor C38 is used during the testing period to provide power to relays 56 and the control transistors in module 24 necessary to reinsert the electronic device back into the telephone line upon the cessation of testing. Relays 56 preferably comprise two sets of latching relays or other switching elements connected between the tip and ring lines and the inputs and outputs of the electronic device. During normal operation, the latching relays connect the tip and ring lines to the inputs and outputs from the electronic device so that the electronic device is inserted into the lines. The latching relays are preferably bistable devices that when switched to a position, remain in that position without requiring power. When the system detects the initiation of loop testing and shuts down the voltage from the voltage regulation and shutdown module 14, the charge stored in capacitor C38 supplies power to the latching relays and their control transistors to switch the relays to a bypass mode, in which the electronic device is removed from the telephone lines and the tip and ring lines from the CO and the CPE are connected together, looping around the electronic device.

The micro power supply module 30 preferably comprises a microamp current source 60 that provides current of the order of 1 μA, for example, to the reference voltage module 20 and to a resistor R31 and capacitor C31 connected at the gate of a transistor TR31. The current source, in combination with R31, C31 and TR31, generates a regulated voltage and comprises a power source for the voltage comparator module 18 and the controller module 22. A capacitor C34 connected to the drain of TR31 provides filtering for the power source.

During loop testing when power to the micro power supply from the voltage regulation and shutdown module 14 is turned off, the charge in capacitor C32 provides power to the micro power supply module. Since loop testing may take several minutes, the current consumed by the micro power supply module, the voltage comparator, the controller, and the reference voltage module must be kept low, preferably in the microampere range, since this current must be supplied by the charge on C32.

Current from current source 60 is supplied to the reference voltage module, which may comprise resistors R21, R22 and R23 connected in series as a voltage divider. The current flow through these resistors provides reference voltages at 62 and 64 to a pair of voltage comparators 66 and 68, respectively, connected in parallel in the voltage comparator module 18. The current flowing through resistor R23 produces a first reference voltage at 62 which is supplied to an input of voltage comparator 66. The current flowing through resistors R22 and R23 produce a second reference voltage at 64 which is supplied to an input of the second voltage comparator 68. Voltages 62 and 64 comprise low and high reference voltages, respectively, pre-selected so that the comparators 66 and 68 provide outputs that are indicative of line conditions. The comparators compare an input voltage on line 74 from the high voltage reduction module 16, which, as will be described, is proportional to the output voltage at 42 from module 12 and is representative of the voltage on the telephone line, to the high and low reference voltages and provide either a logic 1 or a logic 0 output depending upon whether input voltage 74 is greater than or less than the reference voltages input to the voltage comparators. Comparator 66 compares the input voltage at 74 to the low reference voltage 62 and outputs a low voltage comparison logic signal $VC_L$. Similarly, voltage comparator 68 compares the input voltage 74 to the high reference voltage 64 and outputs a high level voltage comparison logic signal $VC_H$. The logic signals $VC_L$ and $VC_H$ output from the voltage comparators are input to the microprocessor 50 in controller 22. The voltage comparators in combination with the reference voltage module and the microprocessor 50 comprise a detector which senses line conditions to determine normal telephone operations, and the initiation and the cessation of loop testing, as will be explained shortly.

As shown, the high voltage reduction module 16 may comprise a resistor R12 and a Zener diode D1 connected in series to the output 42 of the lightning protection and AC/DC module 12. Resistor R12 and diode D1 limit the voltage at node A at the junction of the resistor and diode to a predetermined maximum voltage. Node A is connected to a voltage divider comprising resistors R13 and R14 in series. Resistors R12, R13 and R14 comprise a voltage divider, and the voltage at the junction of R13 and R14, which comprises the input voltage 74 to the comparators, is equal to the ratio of R14 to (R12+R13+R14) times the voltage output at 42 from module 12. Accordingly, the input voltage 74 to the voltage comparators is proportional to the voltage at 42 and is representative of the voltage on the telephone line. Since the high voltage reduction module 16 will remain connected to the line and draw current from the line during testing, the voltage divider is preferably designed to have a relatively high input impedance, of the order of 15 MΩ, for example, so that the load it imposes on the line is sufficiently low that it remains essentially undetected during loop testing. This load is preferably in the low microampere range.

The voltage comparator module 18 and the controller module 22 monitor the conditions on the telephone line and detect the initiation and termination of testing. The controller provides control signals to control transistors TR21 and TR22 in the relay control and relay module 24 which control the latching relays 56 to loop around, i.e. bypass, the electronic device during testing and to reinsert the electronic device into the line following testing. The line conditions that characterize testing comprise a combination of voltages on the line, the times or durations for which the voltages are present or absent, as well as the sequences of voltages and the state of the telephone system. Since telephone systems conventionally utilize a plurality of different signaling tones and voltages for normal telephone operations, it is necessary to differentiate between voltages that represent normal telephone operations and those that characterize loop testing. It is also necessary to distinguish extraneous voltages that may be impressed upon the telephone line due, for example, to lightning and the like. The invention preferably comprises a state machine for these purposes, as will be described.

The signaling tones and extraneous impulse voltages that are impressed upon the line ride on the normal DC voltages that are used by the telephone system. As previously noted, the tip (T) line of the twisted pair telephone line is typically grounded at the CO and maintained at a potential of 0 V, while the ring (R) line of the twisted pair is typically at a voltage level of −48 VDC (at the CO) when the telephone is on-hook (hung up). The AC/DC conversion unit 12 preferably provides a positive DC voltage relative to ground potential at its output 42. When the telephone is on-hook, the voltage at 42 may be of the order of +40 VDC at an intermediate line location, and when the telephone goes off-hook, this voltage may drop to the order of +20 VDC. The conventional telephone signaling tones as well as extraneous voltages impressed upon the line ride on these DC voltages. When a Telco initiates MLT testing, it may issue a "Request" which generally removes the voltage from the line temporarily, e.g., 250 msec. This drops the line voltage to approximately 0 VDC for this period of time. Thus, the absence of voltage on the line for a predetermined period of time, such as 250 msec, may be used as an indication of the initiation of line testing. Furthermore, MLT testing typically does not extend longer than approximately 3 seconds, after which the line voltages and operations return to normal. Accordingly, the absence of voltage on the line for longer than another predetermined period of time, e.g., 3 seconds, may be used as an indication of a fault on the line.

The voltage comparators 66 and 68 of voltage comparator module 18 monitor the line voltages (as represented by the voltages at 74) to determine whether they fall within certain predetermined voltage ranges, and provide this information as logic signals to the microprocessor 50 in the controller module 22. The microprocessor, which may comprise a memory embodying computer code, e.g., firmware, functions as a state machine that responds to the outputs from the voltage comparators, recognizes normal telephone operations and other extraneous events, and detects the initiation and the termination of loop testing based upon the logic levels and their timings. Upon detecting the initiation of testing, the microprocessor controls the latching relays 56 to loop around, i.e. bypass, the electronic device, as described, and also provides a control signal via line 80 to transistor TR3 in the voltage regulation and shutdown module to shut down its output voltage at 44 and substantially isolate the system from the telephone lines during testing.

The high and low reference voltages from the reference voltage module 20 to the voltage comparators 68 and 66, respectively, may be established by selecting the values of the resistors R21-R23 in relation to the current from the current source 60 of the micro power supply. The high level reference voltage at 64, which is input to the high voltage comparator 68 and the low level reference voltage at 62 which is input to the low voltage comparator 66 may be selected relative to the input voltage at 74 such that the outputs from the voltage comparators indicate when the telephone is on-hook, when the telephone is off-hook, and when the line voltage is substantially 0 V.

In particular, when the telephone is on-hook and the voltage at 42 is on the order of 40 VDC, the reference voltage at 64 is preferably selected such that the output $VC_H$ of voltage comparator 68 is a logic 1; and when the telephone is off-hook and the voltage at 42 is of the order of 20 VDC, the output $VC_H$ of the high voltage comparator 68 is a logic 0. In both cases, the low level reference voltage at 62 is preferably selected so that the output $VC_L$ of the low level voltage comparator 66 is a logic 1. However, when the voltage on the line at 42 goes to substantially 0 V, as when there is a "Request" signal from the CO indicating the initiation of testing, or in the event of a line fault, the low reference voltage 62 is preferably selected to be higher than the input voltage at 74 to the two comparators and so that the outputs $VC_L$ and $VC_H$ of the comparators will both be a logic 0. These logic levels may be input to the microprocessor 50 as indications of the line conditions, and the microprocessor using its embedded code will detect the initiation and cessation of testing, and distinguish these states from the normal operating conditions of the phone line and from extraneous line voltages and conditions.

Relays 56 in the relay control and relay module 24 preferably comprise two pairs of latching relays or other bistable elements that can be switched between two different states by short voltage pulses and will remain in a state after being switched without the necessity of power being applied to them. Upon the microprocessor 50 detecting the initiation of testing, it may output a pulse on line 84 to the gate of transistor TR21. The pulse turns the transistor on for the duration of the pulse, which supplies power momentarily to the latching relays to switch the relays to a loop around or bypass position. When the microprocessor detects the cessation of testing, it may output a pulse on line 86 to transistor TR22, which momentarily turns the transistor on and applies a voltage to the latching relays to switch the relays back into their non-bypass positions. Power for the transistors and to switch the relays is derived from the relay power supply 32. During normal operations, capacitor C38 in the relay power supply is charged by the output from the voltage regulation and shutdown module 14. When the system detects the initiation of testing and shuts down this output, power for the relays and the control transistors may be supplied from the charge on C38. Similarly, when the system detects the cessation of testing, the output from the voltage regulation and shutdown module is reapplied, and power is applied to the relays and control transistor from C38 and directly from the output of the voltage regulation and shutdown module. The width of the pulses and the characteristics of the control transistors TR21 and TR22 may be selected based upon the types of latching relays selected. In the preferred embodiment, these relays may be type HD3/4.5-L2D1R devices, which operate on pulses having a width (time duration) of the order of 10 msec.

Normally, transistor TR3 in the voltage regulation and shutdown module 14 is turned off. When microprocessor 50 detects the initiation of testing, it may supply a control signal to line 80 connected to the gate 48 of TR3. This turns TR3 on which, in turn, turns off transistors TR1 and TR2, shutting down the output voltage from the module as previously described. The control signal is maintained by the microprocessor on line 80 for the duration of testing so that transistor TR3 remains conducting and transistors TR1 and TR2 remain non-conducting during testing. Upon detecting the end of testing, the microprocessor removes the control signal on line 80, turning transistor TR3 off. This, in turn, turns transistors TR1 and TR2 back on so that module 14 supplies power to the system.

As may be appreciated, since during testing when the voltage from module 14 is shut down, with the exception of the high voltage reduction circuit which is still connected to the line, power to the remainder of the system is derived from capacitor C32 in the micro power supply and capacitor C38 in the relay power supply. Since upon entering the testing state the system must remain active to detect the end of testing, the system is preferably designed to operate at very low currents, in the low microampere range, for example, in order to minimize the size of the capacitors. Alternatively, the system may use a supplemental voltage source, such as batteries, to power the system during testing.

Figure 3:
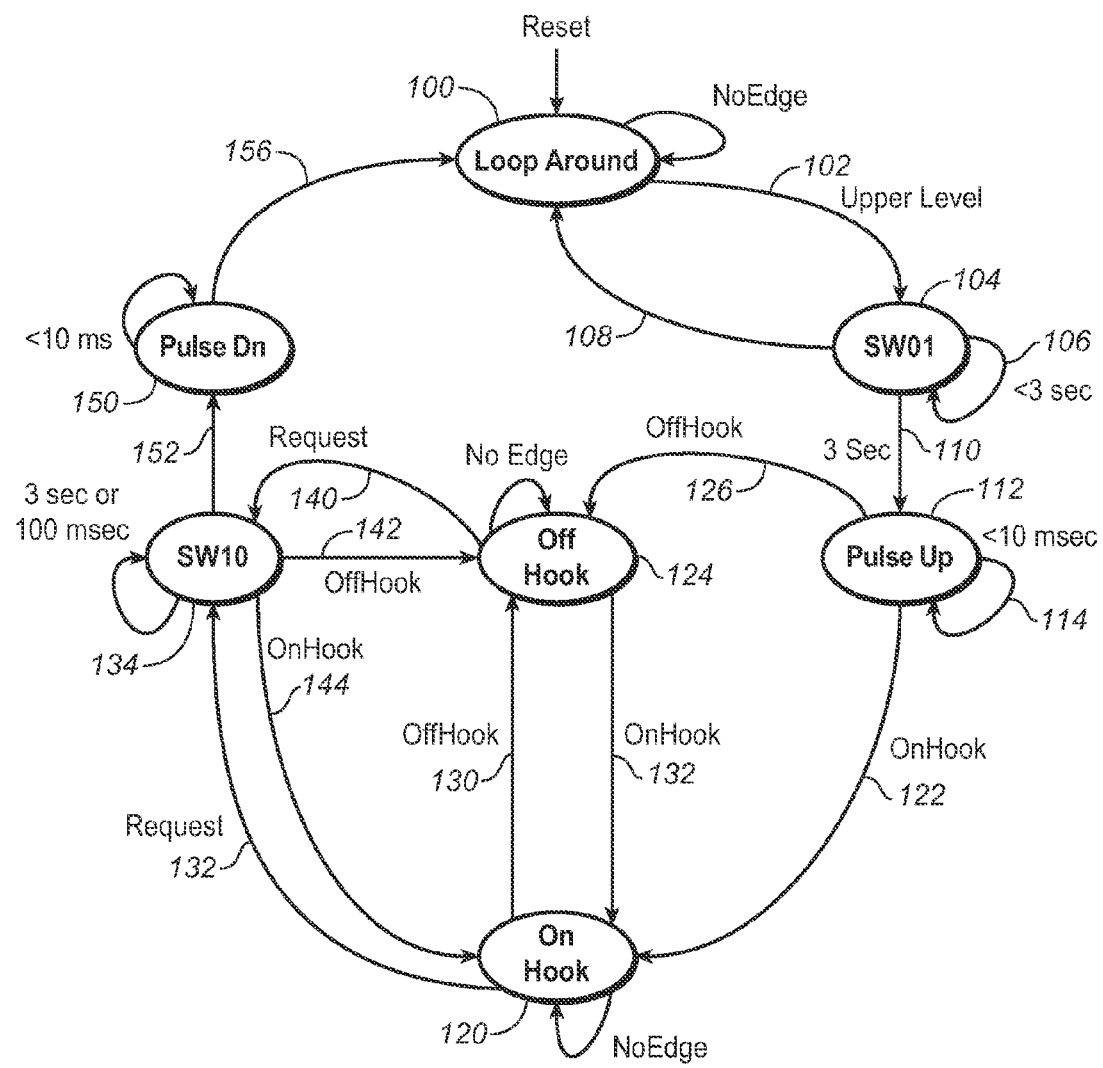
FIG. 3 is a state diagram that illustrates the operation of the system illustrated in FIGS. 1 and 2.

FIG. 3 is a state diagram that illustrates a preferred operation of the system. As noted previously, the microprocessor 50 with its embedded code comprises a state machine that operates in the manner illustrated in FIG. 3 to control the system. Referring to the figure, upon applying power to the telephone line, as following a power failure or following a "Request" signal which temporarily takes the line voltage to 0 V and indicates initiation of testing, the state machine and the system enter a loop around or bypass state 100. The state machine will remain in the loop around state until the output signal $VC_H$ from comparator 68 goes high, i.e., to a logic 1, at which point the state machine will transition via path 102 to a wait state (SW01) 104, and start a timer. The state machine will remain in the wait state SW01, as indicated at 106, until one of two events occurs. Either the output $VC_L$ from comparator 66 goes to logic 0, or the timer reaches a predetermined time, e.g., 3 seconds. If during this time interval $VC_L$ goes to logic 0, indicating that the system should remain in the bypass state, the state machine transitions via path 108 back to the loop around state 100. Otherwise, upon the timer reaching the preselected time, i.e., 3 seconds, the state machine transitions via path 110 to a "Pulse Up" state 112. This predetermined time interval may be programmable, and is preferably selected to be greater than the anticipated longest time that single MLT testing sequence will normally take to prevent the system from prematurely exited the bypass state while testing is still going on. Since some MLT testing sequences may extend as long as and cause $VC_L$ to be high for as long as 2.5 seconds, the time interval may be selected to be 3 seconds.

Upon entering the Pulse Up state 112, the system exits the bypass or loop around state by generating a pulse having a predetermined width (time duration) on line 86 to transistor TR22 to disable the loop around latching relays 56 and return to the non-bypass mode. The state machine also removes the control signal on line 80 to transistor TR3 to turn the transistor off and reapply power to the system from the voltage regulation and shutdown module 14. The pulse width (time duration) may be of the order of 10 msec as indicated at 114. As previously indicated, this is determined by the particular latching relays employed.

Upon exiting the bypass mode in state 112, the state machine will transition either to an on-hook state 120 via path 122 or to an off-hook state 124 via path 126, depending upon the output levels from voltage comparators 66 and 68. If $VC_H=1$, and $VC_L=1$, indicating the line voltage to be at a normal high on-hook level the system will transition to the on-hook state 120. If, however, $VC_H=0$, and $VC_L=1$, indicating the line voltage to be at an intermediate off-hook level, the system will transition to the off-hook state 124. The on-hook state 120 is the normal wait state of the system, as on-hook is the usual operating state of the telephone system. The system will remain in the on-hook state 120 until either the phone goes off-hook, or a Request for loop around is detected. If the phone goes off-hook, as indicated by $VC_H$ going to logic 0 while $VC_L$ remains at logic 1, the system will transition via path 130 to the off-hook state 124 where it will remain until $VC_H$ returns to logic 1. When this occurs, the state machine will transition via path 132 back to the on-hook state.

If, however, while in on-hook state 120 a Request for a loop around is detected by both $VC_H$ and $VC_L$ going to logic 0 for a preselected period of time, e.g., 100 msec, the state machine transitions via path 132 to a wait state (SW10) 134. The system will also transition via path 132 to wait state 134 upon a temporary loss of power on the line.

The state machine will remain in the off-hook state 124 as long as $VC_H=0$ and $VC_L=1$, or until a Request is detected as indicated by both signals being at logic 0 for a selected time, e.g., 100-200 msec, at which point the state machine will transition via path 140 to wait state (SW10) 134.

The function of a wait state SW10 is to determine whether the loop around Request is valid. Standard telephone signaling operations, like ringing, pulse dialing, call waiting, and others, may generate false loop around Requests. The amount of time that a presumed Request must be valid is dependent upon the previous state of the system. If the Request is determined to be not valid, the state machine returns to its previous state. For the Request to be valid, it is presumed that the both logic levels $VC_H$ and $VC_L$ must remain at logic 0 for a selected time, e.g., of the order of 3 seconds if the previous state was off-hook, and between 100-200 msec if the previous state was on-hook. From the wait state 134, in the absence of a valid Request, the state machine will transition back to the off-hook state 124 via path 142, or will transition back to the on-hook state 120 via path 144. On the other hand, if the Request is determined to be valid, the system will transition from wait state SW10 to a Pulse Down ("Pulse Dn") state 150 via path 152. In the Pulse Dn state, the microprocessor 50 generates a pulse signal on line 84 to transistor TR21 having a pulse width sufficient to activate latching relays 56 and switch them to the bypass state. Additionally, the microprocessor will issue a control signal on line 80 to transistor TR3 to turn the transistor on and shut down the voltage from the voltage regulation and shutdown module 14, as previously described. The state machine then enters a loop around state 100 via path 156. The system will remain in the loop around state until the conditions for transition to state SW01 occur, as previously described.

Thus, as described, the state machine controls the system based upon a combination of detected line conditions, i.e., the line voltages, their sequences, and predetermined time intervals. Since conventional MLT testing is generally preceded by the line voltages being removed for a period of the order of 250 msec or more (at the beginning of testing), the state machine of FIG. 3 will assume a valid Request upon the occurrence of these conditions. Moreover, since a single loop test sequence normally does not extend beyond approximately 2.5 seconds, a time interval of the order of 3 seconds may be selected for wait state SW01 in order to allow MLT testing to be concluded before transitioning back to a non-bypassed state. As will be appreciated, however, different times and different operating conditions may be selected based upon the testing protocols used on different telephone systems.

The foregoing has described a system as being line powered from the telephone line in which it is used. This is the preferred embodiment, since otherwise it is necessary to power the system either via a separate telephone line pair, which is inefficient and prevents the second pair from being used for normal telephone signals, or to power the system with an external power source which may be inconvenient since it is typically employed at an intermediate location which may be remote from an external power source. Nevertheless, the system may be used effectively being powered either from the same telephone line pair in which it performs the loop around function, as described in the foregoing preferred embodiment, or powered separately from the line in which it is used. If the system is powered separately, changes may be made to the lightning protection and AC/DC conversion circuit 12 as appropriate for the power source.

Advantageously, a system in accordance with the invention may be employed by a Telco to controllably bypass a line amplifier or other line device in a customer's line who has failed to pay his bill, while allowing normal telephone operations. Moreover, as will be appreciated, the system may be designed to respond to specially prescribed line signals that may be broadcast by a Telco in advance of an MLT test to announce the initiation of testing.

While the foregoing has been with reference to preferred embodiments of the invention, it will be appreciated by those skilled in the art that changes in these embodiments may be made without departing from the principals and the spirit of the invention, the scope of which is defined by the appended claims.

The invention claimed is:

1. A method of bypassing an electronic device during central office testing of a telephone line, comprising:
   detecting by a controller at an intermediate location in the telephone line between a central office and customer premises the initiation of said central office testing of the line, wherein said intermediate location is remote from both the central office and the customer premises;
   automatically switching a plurality of relays by the controller to bypass the electronic device at said intermediate location from said line upon detection of said initiation of central office testing, thereby electrically disconnecting the electronic device from the line;
   detecting by the controller the cessation of said central office testing; and
   automatically switching the plurality of relays by the controller to reinsert said electronic device into the line upon detection of said cessation of testing, thereby electrically reconnecting the electronic device to the line.

2. The method of claim 1, wherein switching said plurality of relays to bypass the electronic device and switching the plurality of relays by the controller to reinsert said electronic device comprises switching said electronic device out of and into said line using latching devices that require no power to maintain a switched state.

3. The method of claim 1, wherein said determining said cessation comprises monitoring the line during said testing without being detected by said testing.

4. The method of claim 3, wherein said monitoring comprises sensing a predetermined set of line conditions, and determining the cessation of testing using a state machine.

5. The method of claim 4, wherein said predetermined set of line conditions comprises one or more voltages having predetermined values for predetermined times.

6. The method of claim 1, wherein said detecting comprises detecting the occurrence for a predetermined time of a predetermined line voltage.

7. The method of claim 6, wherein said predetermined line voltage comprises the substantial absence of voltage on said line.

8. The method of claim 7, wherein said predetermined time is of the order of at least 250 msec or more.

9. The method of claim 1, wherein said electronic device is a DSL line conditioner.

10. The method of claim 1, wherein during normal operation, the controller is supplied with power from the telephone line, the method further comprising interrupting current from the line to the controller during said testing, thereby substantially isolating the controller from the line during said testing.

11. The method of claim 10, further comprising supplying said controller with power from a supplemental power source independent of the line during said testing.

12. The method of claim 11, wherein said supplemental power source comprises one or more capacitors that store charge which powers the controller upon current being interrupted during testing.

13. The method of claim 1, wherein during normal operation, the relays are supplied with power from the telephone line, the method further comprising interrupting current from the line to the relays during said testing, thereby substantially isolating the relays from the line during said testing.

14. The method of claim 13, further comprising supplying said relays with power from a supplemental power source independent of the line during said testing.

15. The method of claim 14, wherein said supplemental power source comprises one or more capacitors that store charge which powers the relays upon current being interrupted during testing.

16. A method of automatically bypassing an electronic device at an intermediate location of a telephone line between a central office and customer premises, comprising:
    detecting by a controller at said intermediate location in the telephone line a first predetermined set of line conditions, wherein said intermediate location is remote from both the central office and the customer premises;
    automatically switching the plurality of relays by the controller to bypass said line around said electronic device in response to said detecting, thereby electrically disconnecting the electronic device from the line;
    monitoring by the controller said line at said intermediate location without imposing a detectable load on said line to detect the occurrence of a second predetermined set of line conditions after a preselected time; and
    automatically switching the plurality of relays by the controller to reinsert said electronic device into said line in response to said monitoring upon detecting the occurrence after said preselected time of said second predetermined set of line conditions, thereby electrically reconnecting the electronic device to the line.

17. The method of claim 16, wherein said first predetermined set of line conditions comprises the absence of line voltages for a first predetermined time period, and said second predetermined set of line conditions comprises the occurrence of one or more line voltages corresponding to normal telephone line operating voltages.

18. The method of claim 17, wherein said automatically bypassing and reinserting said electronic device comprises switching said electronic device out of and into said line with bistable switching elements that remain in a switched position without the application of power.

19. The method of claim 17, wherein said first predetermined set of line conditions comprise the initiation of line testing by a telephone central office, and said second set of predetermined line conditions comprise the termination of testing, and wherein said preselected time is of the order of seconds.

20. The method of claim 16, wherein said monitoring comprises monitoring the line using a system that substantially isolates itself electrically from the line during said preselected time.

21. The method of claim 16, wherein said electronic device is a DSL line conditioner.

22. The method of claim 16, further comprising interrupting current from the line to the controller during said testing, thereby substantially isolating the controller from the line during said testing.

23. The method of claim 22, further comprising supplying said controller with power from a supplemental power source independent of the line during said testing.

24. The method of claim 23, wherein said supplemental power source comprises one or more capacitors that store charge which powers the controller upon current being interrupted during testing.

25. The method of claim 16, further comprising interrupting current from the line to the relays during said testing, thereby substantially isolating the relays from the line during said testing.

26. The method of claim 25, further comprising supplying said relays with power from a supplemental power source independent of the line during said testing.

27. The method of claim 26, wherein said supplemental power source comprises one or more capacitors that store charge which powers the relays upon current being interrupted during testing.

28. A system for bypassing an electronic device in a telephone line during central office testing of the line, comprising:
    a detector located at an intermediate location in the telephone line between the central office and customer premises for monitoring conditions on said line to detect the occurrence of a first line condition that indicates the initiation of said testing and to detect the occurrence of a second line condition that indicates the cessation of said testing, wherein said intermediate location is remote from both the central office and the customer premises;
    a plurality of switches connected to electronic device and to said line;
    a controller responsive to said detector and connected to said plurality of switches for automatically controlling said switches to switch said electronic device out of said line by electrically disconnecting the electronic device from the central office and the customer premises upon detecting the occurrence of said first line condition and to switch said electronic device into said line by electrically connecting the electronic device to the central office and the customer premises upon detecting the occurrence of said second line condition; and
    a shutdown module that substantially isolates the system electrically from the line during said testing by interrupting current to the system from the line.

29. The system of claim 28, wherein said detector comprises a line voltage monitor and a state machine for determining the occurrences of first and second predetermined line voltages, and first and second predetermined periods of time.

30. The system of claim 29, wherein said voltage monitor comprises comparators that detect the occurrence of voltages representative of said line voltages in predetermined voltage ranges.

31. The system of claim 29 wherein said shutdown module comprises a voltage regulator for said system that is controlled by said state machine to interrupt power to the system from the line upon detecting the first set of line conditions, and wherein said system comprises a supplemental power source for powering said system independent of the line during said testing.

32. The system of claim 31, wherein said supplemental power source comprises one or more capacitors that store charge which powers the system upon power being interrupted during testing.

33. The system of claim 32, wherein said system comprises a microampere current source which supplies power to said comparators and to said state machine during testing.

34. The system of claim 28, wherein said electronic device is a DSL line conditioner.

\* \* \* \* \*